United States Patent
Choi et al.

(10) Patent No.: US 9,124,478 B2
(45) Date of Patent: Sep. 1, 2015

(54) METHOD FOR CANCELLING INTER-SUBCARRIER INTERFERENCE AND APPARATUS FOR THE SAME

(71) Applicants: POSTECH ACADEMY—INDUSTRY FOUNDATION, Gyeongbuk (KR); INDUSTRY-ACADEMIC COOPERATION FOUNDATION, YEUNGNAM UNIVERSITY, Gyeongsangbuk-do (KR)

(72) Inventors: Kwon Hue Choi, Gyeongsangbuk-do (KR); Bong Seok Kim, Gyeongsangbuk-do (KR)

(73) Assignees: POSTECH ACADEMY-INDUSTRY FOUNDATION, Gyeongbuk (KR); INDUSTRY-ACADEMIC COOPERATION FOUNDATION, YEUNGNAM UNIVERSITY, Gyeongsangbuk-do (KR)

( * ) Notice: Subject to any disclaimer, the term of this patent is extended or adjusted under 35 U.S.C. 154(b) by 0 days.

(21) Appl. No.: 14/312,619

(22) Filed: Jun. 23, 2014

(65) Prior Publication Data
US 2015/0016552 A1  Jan. 15, 2015

(30) Foreign Application Priority Data
Jul. 10, 2013  (KR) .......................... 10-2013-0081223

(51) Int. Cl.
*H04L 1/04*  (2006.01)
*H04L 27/26*  (2006.01)
*H04B 15/00*  (2006.01)

(52) U.S. Cl.
CPC .............. *H04L 27/263* (2013.01); *H04B 15/00* (2013.01)

(58) Field of Classification Search
USPC .......... 375/259, 260, 267, 285, 295, 296, 299
See application file for complete search history.

(56) References Cited

U.S. PATENT DOCUMENTS

| | | | |
|---|---|---|---|
| 7,382,718 B2* | 6/2008 | Chang et al. ................... | 370/204 |
| 7,505,529 B2* | 3/2009 | Kwak et al. .................... | 375/295 |
| 7,952,989 B2* | 5/2011 | Qi et al. ......................... | 370/208 |
| 2004/0081131 A1* | 4/2004 | Walton et al. .................. | 370/344 |

(Continued)

FOREIGN PATENT DOCUMENTS

| | | |
|---|---|---|
| EP | 1962463 A1 | 8/2008 |
| JP | 2008-118656 A1 | 5/2008 |

OTHER PUBLICATIONS

English Abstract for Japanese Publication No. JP2008-118656, published on May 22, 2008 (2 pages).

(Continued)

*Primary Examiner* — Siu Lee
(74) *Attorney, Agent, or Firm* — Osha Liang LLP (57) ABSTRACT

Disclosed are a method for cancelling inter-subcarrier interferences and an apparatus for the same. The method according to an example embodiment may comprise dividing total available subcarriers into a plurality of sub-blocks, composing Alamouti code symbol pairs by mapping input symbols to subcarriers included in each of the plurality of sub-blocks, and performing inverse fast Fourier transform (IFFT) on the Alamouti code symbol pairs. Therefore, inter-subcarrier interferences due to frequency error between transmit antennas of a distributed antenna system or a cooperative transmission apparatus may be cancelled in the frequency selective fading channel environment.

4 Claims, 10 Drawing Sheets

(56) References Cited

U.S. PATENT DOCUMENTS

2009/0004984 A1   1/2009  Chrabieh et al.
2010/0041350 A1*  2/2010  Zhang et al. .................. 455/101
2014/0140437 A1*  5/2014  Choi et al. .................... 375/296

OTHER PUBLICATIONS

Kim, Bong-seok et al., "ICI Self-cancelled Alamouti Coded OFDM for Distributed Antenna Systems—Part II: under selective fading channel," Research Paper with English Abstract, Yeungnam University, Gyeongsangbuk-do, Republic of Korea (3 pages), Jan. 2013.

* cited by examiner

METHOD FOR CANCELLING INTER-SUBCARRIER INTERFERENCE AND APPARATUS FOR THE SAME

CLAIM FOR PRIORITY

This application claims priority to Korean Patent Application No. 10-2013-0081223 filed on Jul. 10, 2013 in the Korean Intellectual Property Office (KIPO), the entire contents of which are hereby incorporated by reference.

BACKGROUND OF INVENTION

1. Technical Field

Example embodiments of the present invention relate in general to a technology for cancelling interference in a wireless communication system, and more specifically, to a method of cancelling inter-subcarrier interference in a wireless communication system, which can efficiently cancel inter-subcarrier interference in a frequency selective fading channel environment, and an apparatus for the same.

2. Related Art

According to rapid advances of wireless communication system, demands on transmitting and receiving a high-speed large amount of data are increasing. For this, a method of installing a plurality of distributed antennas additionally in the conventional cell coverage, and performing cooperative communications between a plurality of transmitters and a plurality of receivers, which are geographically distributed, is being used.

Such the distributed antenna system has an effect of resolving a problem of coverage hole, decreasing transmission power, and enhancing transmission efficiency per bandwidth, and especially a system which makes use of relay nodes connected to a base station through optic cables as distributed antenna has a strong point in high-efficient resource allocation and cooperative signal transmissions between distributed antennas, since the system does not require additional radio resources for relaying and transmission/reception of control signals.

Meanwhile, since circuits processing a large number of subcarriers may be implemented on a single integrated circuit according to advances of semi-conductor technology, it has become possible to convert high-speed serial data into low-speed parallel data and transmit the converted low-speed parallel data. In addition, since computation has become more simplified according to adopting a Fast Fourier Transform (FFT) signal processing, an Orthogonal Frequency Division Multiplexing (OFDM) is being applied to various commercial wireless or mobile telecommunication systems.

Since a plurality of subcarriers are used in a wireless communication system using OFDM, signal can be transmitted using a property of flat channel even in a wireless environment having frequency selective fading channel. Through the above mentioned characteristic of OFDM, efficiency of bandwidth and data throughput may be enhanced, and modulation and coding scheme may be adapted to state of each of a plurality of channels. In addition, divided data resources may be multiplexed.

However, since OFDM uses characteristic of orthogonality between multiple subcarriers, it is very sensitive to frequency synchronization between subcarriers. Especially, in a wireless communication environment using a plurality of transmission points (or, nodes) such as a distributed antenna system and a cooperative transmission system, synchronization errors between subcarriers may cause significant performance degradation.

On the other hand, recently, an Alamouti coded OFDM, which obtains transmit antenna gains by using Alamouti codes in distributed antenna system, is being used. In the distributed antenna system, in order to maximize diversity gain, interferences due to frequency errors are required to be reduced.

As described above, studies for reducing inter-subcarrier interference in a wireless communication system using OFDM have progressed. However, since ongoing studies on reducing inter-subcarrier interference mainly have focused upon a wireless channel environment having flat fading property, there is a problem of performance degradation when they are applied to a frequency selective fading channel environment.

SUMMARY

Accordingly, example embodiments of the present invention are provided to substantially obviate one or more problems due to limitations and disadvantages of the related art.

Example embodiments of the present invention provide a method for cancelling inter-subcarrier interferences in distributed antenna system which can efficiently cancel the inter-subcarrier interferences.

Example embodiments of the present invention also provide an apparatus for cancelling inter-subcarrier interferences in distributed antenna system which can efficiently cancel the inter-subcarrier interferences.

In some example embodiments, a method for cancelling inter-subcarrier interference, performed in a transmitting apparatus, may comprise dividing total available subcarriers into a plurality of sub-blocks, composing Alamouti code symbol pairs by mapping input symbols to subcarriers included in each of the plurality of sub-blocks, and performing inverse fast Fourier transform (IFFT) on the Alamouti code symbol pairs.

Here, a number of the sub-blocks may be determined according to characteristics of channel between the transmitting apparatus and a counterpart receiving apparatus.

Here, the composing Alamouti code symbol pairs may include locating a mirror point between $(n_c/2)$th subcarrier and $(n_c/2+1)$th subcarrier for each of the plurality of sub-blocks when each of the plurality of sub-blocks comprises $n_c$ subcarriers, and composing each pair of the Alamouti code symbol pairs by selecting pair of subcarriers located in mirror image points in reference to the mirror point.

Here, 2N-point IFFT may be performed on the Alamouti code symbol pairs in the performing inverse fast Fourier transform (IFFT).

Here, the Alamouti code symbol pairs may be inputted to inputs 1 to $n_c$ of the IFFT, and 0s may be inputted to inputs $(n_c+1)$ to $2n_c$ of the IFFT, wherein the inputs 1 to $2n_c$ are corresponded to each of the plurality of sub-blocks.

In other example embodiments, an apparatus for cancelling inter-subcarrier interference may comprise a sub-block dividing part dividing total available subcarriers into a plurality of sub-blocks, and composing Alamouti code symbol pairs by mapping input symbols to subcarriers included in each of the plurality of sub-blocks; and an inverse fast Fourier transform (IFFT) part performing IFFT on the Alamouti code symbol pairs.

Here, the sub-block dividing part may determine a number of the sub-blocks according to characteristics of channel between the apparatus and a counterpart receiving apparatus.

Here, the sub-block dividing part may compose the Alamouti code symbol pairs by selecting pair of subcarriers located in mirror image points in reference to the mirror point located between (n/2)th subcarrier and ($n_c$/2+1)th subcarrier for each of the plurality of sub-blocks when each of the plurality of sub-blocks comprises $n_c$ subcarriers.

Here, the IFFT part may perform 2N-point FFT on the Alamouti code symbol pairs, wherein N is a natural number.

Here, the Alamouti code symbol pairs may be inputted to inputs 1 to $n_c$ of the IFFT part, and 0s may be inputted to inputs ($n_c$+1) to $2n_c$ of the IFFT part, wherein the inputs 1 to $2n_c$ are corresponded to each of the plurality of sub-blocks.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, example embodiments of the present invention will be described in detail with reference to the accompanying drawings. In describing the invention, to facilitate the entire understanding of the invention, like numbers refer to like elements throughout the description of the figures, and a repetitive description on the same element is not provided.

A method of cancelling inter-subcarrier interference in distributed antenna system according to an example embodiment of the present invention may be applied to a system using Alamouti coded orthogonal frequency division multiplexing (OFDM) in cooperative communication environment performing cooperative communications between distributed base stations and a plurality of transmission/reception points.

Also, the term a 'receiving apparatus' or a 'receiver' in the specification may mean a mobile station (MS), a mobile terminal (MT), a user terminal (UT), a user equipment (UE), a user device, a wireless terminal, an access terminal, a subscriber unit, a subscriber station (SS), a wireless device, a wireless communication device, a wireless transmit/receive unit (WTRU), a mobile node, a mobile and so on.

Also, the term a 'transmitting station, a 'transmitter', or 'point' may mean generally a fixed node or a mobile node communicating with the terminal, and may be referred as a base station, a Node-B, a eNode-B, a base transceiver system (BTS), an access point, a transmission point, a Remote Radio Head (RRH), a Remote Radio Equipment (RRE) and so on.

Hereinafter, explained is an example in which a method for cancelling inter-subcarrier interference of wireless communication system according to the present invention is applied to wireless communication system using OFDM. Also, a method for cancelling inter-subcarrier interference of wireless communication system according to the present invention may be applied to a distributed antenna system or a cooperative communication system which transmits and receives signal using a plurality of transmit antennas and at least one receive antenna. Hereinafter, for conveniences of explanation, a distributed antenna system using two transmit antennas and one receive antenna will be explained. However, the technical thought of the present invention is not limited to the above specific case, but may be applied to a wireless communication system having any plurality of transmit antennas and receive antennas.

Figure 1:
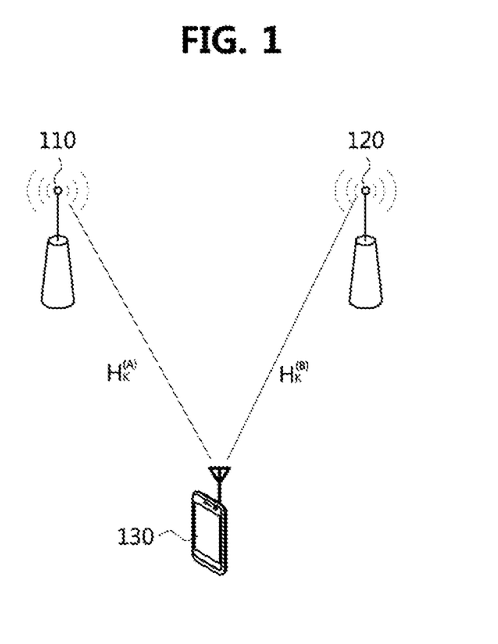
FIG. 1 is a conceptual diagram to illustrate a wireless communication environment in which a method of cancelling inter-subcarrier interference according to an example embodiment of the present invention.

FIG. 1 is a conceptual diagram to illustrate a wireless communication environment in which a method for cancelling inter-subcarrier interference according to an example embodiment of the present invention.

Referring to FIG. 1, a method for cancelling inter-subcarrier interference according to the present invention may be applied to a distributed antenna system equipped with a plurality of transmit antennas and one receive antenna.

That is, as shown in FIG. 1, a method for cancelling inter-subcarrier interference according to the present invention may be applied to a distributed antenna system environment having a first transmit antenna 110, a second transmit antenna 120, and a receive antenna 130.

In FIG. 1, it is assumed that a frequency error ϵ exists between signals transmitted by the first antenna 110 and the second antenna 120. Here, the frequency error ϵ may be calculated as below equation 1.

$$\epsilon = (f_c^{(A)} - f_c^{(B)})/f\Delta \quad \text{Equation 1}$$

In the equation 1, $f_c^{(A)}$ and $f_c^{(B)}$ of signal transmitted from the first antenna 110 and a subcarrier frequency of signal transmitted from the second antenna 120. In addition, may mean spacing between subcarriers.

Hereinafter, in a method for cancelling inter-subcarrier interference according to the present invention, channels between each of the first and second antennas 110 and 120 and the receive antenna 130 may be represented as $H_k^{(A)}$ and $H_k^{(B)}$ respectively. Here, distributions of $H_k^{(A)}$ and $H_k^{(B)}$ may be assumed as complex Gaussian distributions having average of 0 and variance of 1. Also, in the present invention, signals from each transmit antenna may be assumed to be transmitted using N subcarriers.

When a lth symbol transmitted through each transmit antenna is represented as $\chi_l$, Alamouti code symbol pair for two symbols $\chi_l$ and $\chi_{l+1}$ which are continuous in time domain may comprise $-\chi^*_{l+1}$ and $\chi^*_l$. Also, Alamouti code symbol transmitted through kth subcarrier from the first and second antennas 110 and 120 may be represented as $X_k^{(A)}$ and $X_k^{(B)}$ respectively.

Figure 2:
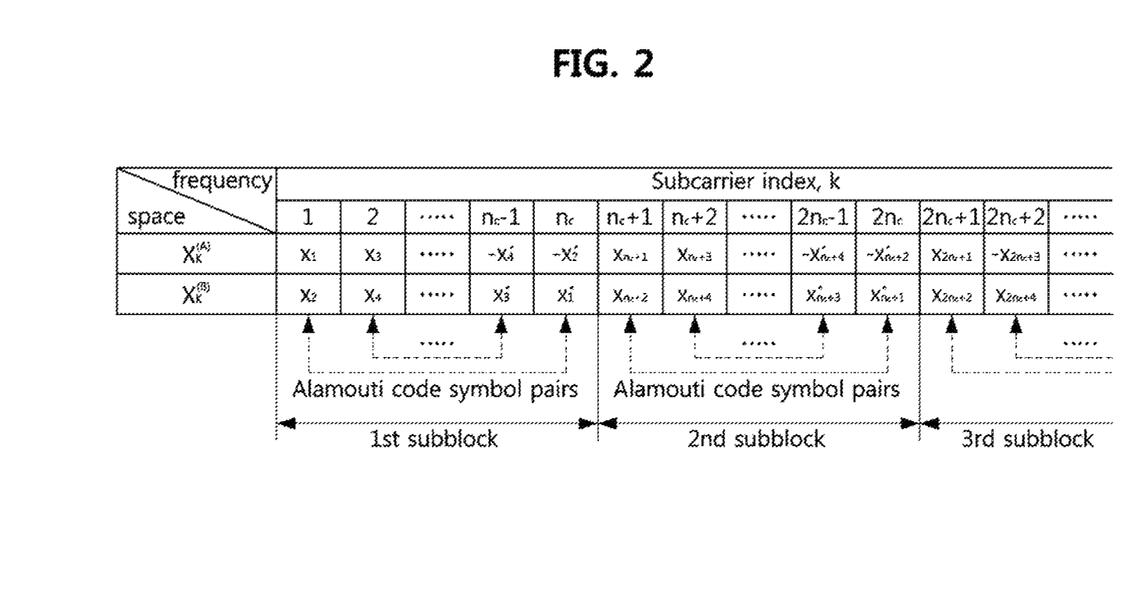
FIG. 2 is a conceptual diagram to explain a method of cancelling inter-subcarrier interference according to an example embodiment of the present invention.

FIG. 2 is a conceptual diagram to explain a method for cancelling inter-subcarrier interference according to an example embodiment of the present invention, and illustrates an example of method for cancelling interference due to frequency error generated by frequency selective fading in a wireless communication environment using Alamouti-coded OFDM.

Referring to FIG. 2, in a method of cancelling inter-subcarrier interference according to an example embodiment of the present invention, total available subcarriers may be divided into a plurality of sub-blocks, and Alamouti code symbol pairs may be composed by mapping input symbols to subcarriers included in each of the plurality of sub-blocks.

Specifically, when the number of total available subcarriers is N, in the present invention, N subcarriers may be divided into $N_b$ sub-blocks, and Alamouti code symbol pairs may be selected using mirror image for each of divided sub-blocks.

In FIG. 2, $n_c$ may mean the number of subcarriers included in each sub-block, and so the number of subcarriers included in each sub-block may be $N/N_b$ (that is, $n_c = N/N_b$) when the number of sub-blocks is $N_b$. Here, the number of sub-blocks (or, the number of subcarriers included in each sub-block) may be determined adaptively according to frequency selective characteristic of channel. Thus, each of transmission points may determine frequency selective characteristic of channel based on channel measurement information provided from corresponding receiving apparatus, and determine the number of sub-blocks according to the determined channel characteristic.

As shown in FIG. 2, total available subcarriers may be divided into a plurality of sub-blocks in a method for cancelling inter-subcarrier interference according to an example embodiment of the present invention. Accordingly, channel may be considered to have flat fading characteristic in each sub-block although the channel is frequency selective from a perspective of total subcarriers. Therefore, a method for cancelling inter-subcarrier interference, which can be applied to flat fading environment, may be applied to each of the sub-blocks in order to cancel whole inter-subcarrier interferences.

Figure 3:
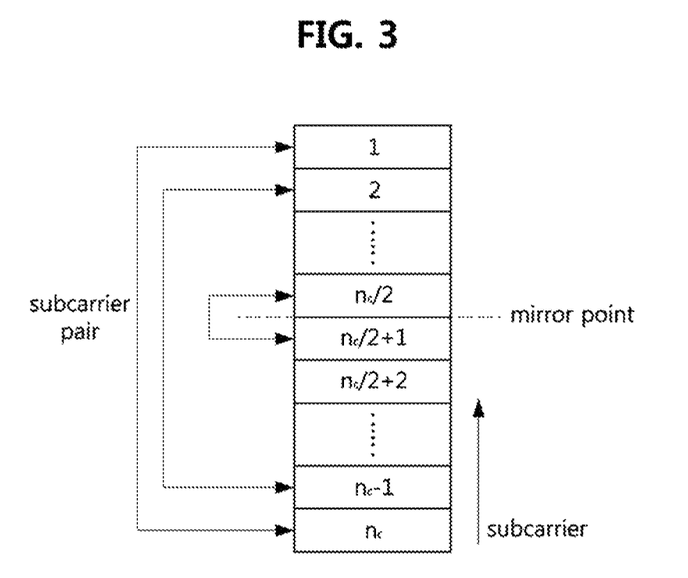
FIG. 3 is a conceptual diagram to explain a method of selecting a pair of subcarriers, which will be mapped by Alamouti code symbol pair, for each sub-block in illustrated in FIG. 2.

FIG. 3 is a conceptual diagram to explain a method of selecting a pair of subcarriers, which will be mapped by Alamouti code symbol pair, for each sub-block in illustrated in FIG. 2.

Referring to FIG. 3, when each sub-block comprises $n_c$ subcarriers, a mirror point may be located between (n/2)th subcarrier and $(n_c/2+1)$th subcarrier for each of the sub-blocks. Then, each pair of the Alamouti code symbol pairs may be composed by selecting pair of subcarriers located in mirror image points in reference to the mirror point.

For example, as shown in FIG. 3, a first subcarrier and $(n_c)$th subcarrier located in a mirror image point corresponding to the first subcarrier may be used to compose an Alamouti code symbol pair, and a second subcarrier and $(n_c-1)$th subcarrier located in a mirror image point corresponding to the second subcarrier may be used to compose another Alamouti code symbol pair.

As explained above, since Alamouti code symbol pairs are composed by using mirror image for each sub-block in the present invention, interference components due to frequency error may be efficiently canceled using characteristics of Alamouti code symbol pairs composed as described above, even when a corresponding receiving apparatus does not perform a complicated frequency synchronization procedure.

Figure 4:
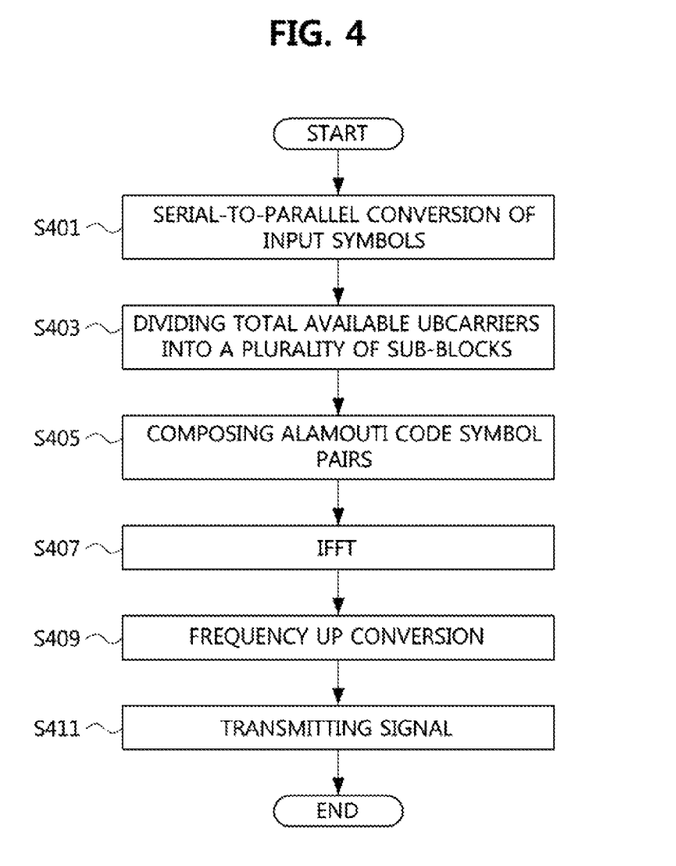
FIG. 4 is a flow chart to explain a method of cancelling inter-subcarrier interference according to an example embodiment of the present invention.

FIG. 4 is a flow chart to explain a method for cancelling inter-subcarrier interference according to an example embodiment of the present invention, and illustrates a procedure of cancelling inter-subcarrier interference, which is performed in an arbitrary point of multiple points constituting a distributed antenna system or a cooperative transmission system.

Referring to FIG. 4, first, input symbols at high-rate may be provided in serial, and converted into parallel symbols at low-rate at S401.

Then, as shown in FIG. 2, total available subcarriers (or, total assignable subcarriers) may be divided into a plurality of sub-blocks at S403. Here, each point (or, transmitting apparatus) may determine frequency selective channel characteristics based on channel measurement information reported from corresponding receiving apparatus, and may determine the number of sub-blocks based on a result of the determination. That is, the number of sub-blocks may be determined adaptively according to the channel characteristics. At this time, if the number of sub-blocks is determined, the number of subcarriers included in each sub-block may be set to a value of the number of total subcarrier divided by the number of sub-blocks.

Then, as shown in FIG. 3, Alamouti code symbol pairs comprising low-rate parallel symbols may be composed by selecting pairs of subcarriers located in mirror image points for each sub-block, and mapping the input symbol to selected pairs of subcarriers at S405.

Then, inverse fast Fourier transform (IFFT) on the Alamouti code symbol pairs may be performed at S407. Here, for the IFFT, a 2N-point IFFF method or a N-point IFFT method may be used. For example, when the 2N-point IFFT method is used, modulated symbols configured with Alamouti code symbol pair may be inputted to inputs 1 to $n_c$ among inputs 1 to $2n_c$ for each sub-block, and zeros may be inputted to inputs $n_c+1$ to $2nc$ among the inputs 1 to $2n_c$ for each sub-block.

Then, a frequency up conversion may be performed on signals on which the IFFT was performed at S409. Here, the frequency up-converted signals may be provided to a corresponding transmit antenna through a digital-to-analog converting or an amplification, and transmitted to a corresponding receiving apparatus through the corresponding transmit antenna at S411.

Figure 5:
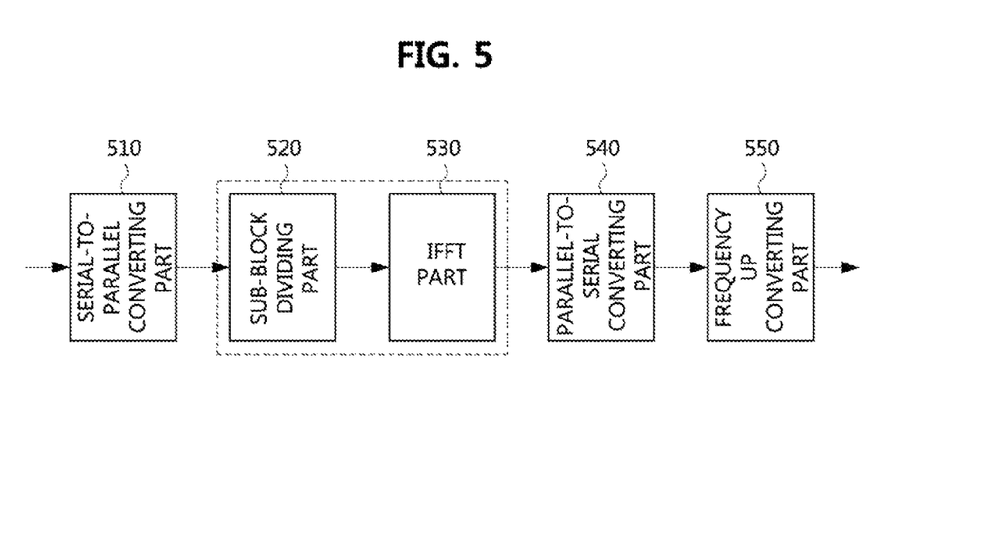
FIG. 5 is a block diagram to explain a configuration of an apparatus for cancelling inter-subcarrier interference according to an example embodiment of the present invention.

FIG. 5 is a block diagram to explain a configuration of an apparatus for cancelling inter-subcarrier interference according to an example embodiment of the present invention, and illustrates a configuration of an apparatus performing the method shown in FIG. 4.

Referring to FIG. 5, the apparatus according to an example embodiment of the present invention may comprise a serial-to-parallel converting part 510, a sub-block dividing part 520, an IFFT part 530, a parallel-to-serial converting part 540, and a frequency up-converting part 550.

The serial-to-parallel converting part 510 may convert modulated input symbols provided in serial into parallel symbols, and provide the parallel symbols to the sub-block dividing part 520.

The sub-block dividing part 520 may divide total available subcarriers into a plurality of sub-blocks, select pairs of subcarriers for each divided sub-block using mirror image points, and compose Alamouti code symbol pairs comprising low-rate parallel symbols by mapping the selected pairs of subcarriers to the input symbols.

Here, the apparatus (that is, each transmission point) may determine frequency selective channel characteristic based on channel state information reported from a corresponding receiving apparatus, and determine the number of sub-blocks according to a the result of determination.

Also, the sub-block dividing part 520 may provide the Alamouti code symbol pairs configured for each divided sub-block to the IFFT part 530. That is, the sub-block dividing part 520 may provide the Alamouti code symbol pairs configured for each divided sub-block to corresponding input terminals among a plurality of input terminals equipped in the IFFT part 530.

The IFFT part 530 may perform IFFT on the Alamouti code symbol pairs provided from the sub-block dividing part 520. Here, the IFFT part 530 may be configured to operate in the 2N-point IFFT manner or in the N-point IFFT manner.

Also, when sizes of each sub-block are fixed (that is, each sub-block has fixed number of subcarriers), the IFFT part 530 may configured as independent IFFT modules each of which processes the Alamouti code symbol pairs for each sub-block. In this case, the IFFT part 530 may comprise the same number of IFFT modules as the number of sub-blocks.

The parallel-to-serial converting part 540 may convert the parallel signals provided from the IFFT part 530 to serial signals.

The frequency up converting part 550 may perform frequency up conversion on signals provided from the parallel-to-serial converting part 540. The signals converted in the frequency up converting part 550 may be provided to a corresponding transmit antenna through amplification etc., and transmitted to a corresponding receiving apparatus through the corresponding transmit antenna.

Although the sub-block dividing part 520 and the IFFT part 530 are implemented separately in the configuration of the apparatus according to an example embodiment of the present invention shown in FIG. 5, this is only one example of various implementations. That is, the technical thought of the present invention is not limited to the configuration shown in FIG. 5. For example, the sub-block dividing part 520 and the IFFT part 530 may be implemented as one component. Alternatively, the IFFT part 530 may be configured to perform functions of the sub-block dividing part 520.

Figure 6:
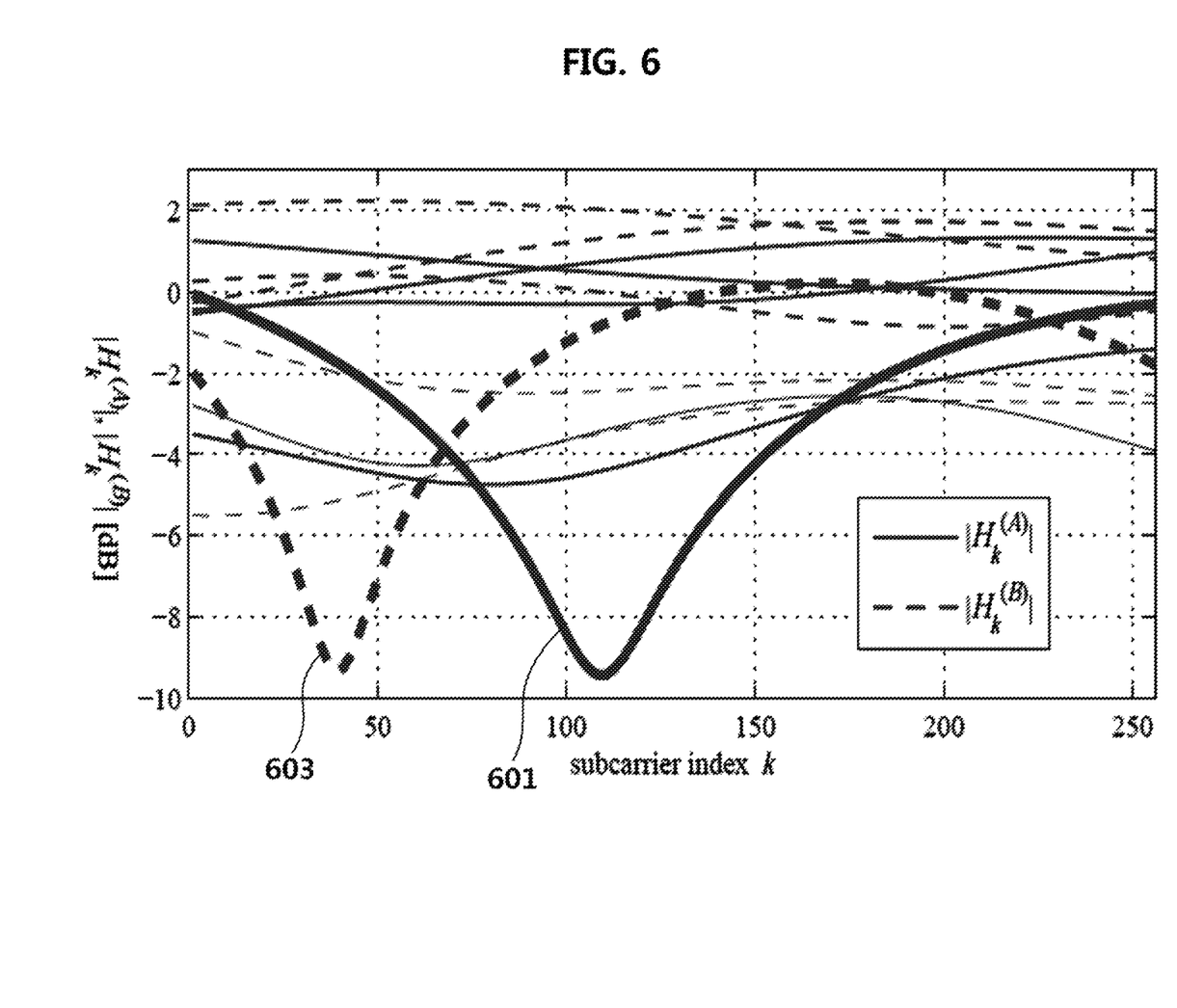
FIG. 6 is a graph to illustrate a frequency selective fading channel characteristic on which a method of cancelling interference according to an example embodiment of the present invention.

FIG. 6 is a graph to illustrate a frequency selective fading channel characteristic on which a method for cancelling interference according to an example embodiment of the present invention, and illustrates measurement results of frequency selective fading environments used for performance evaluation of the method according to an example embodiment of the present invention.

In FIG. 6, a horizontal axis may represent indexes of subcarriers, and a vertical axis may represent channels of kth subcarrier between each of the first and second transmit antennas and the receive antenna.

In FIG. 6, the number of multi-paths is assumed as eight, and a maximum propagation delay is assumed as 0.27 µs when spacing between subcarriers is 15 kHz.

In FIG. 6, a line 601 and a dotted line 603 may represent cases in which significant frequency selective fading exists. In these cases, if the number of subcarriers for each sub-block is not decreased, performance may degrade significantly.

Figure 7A:
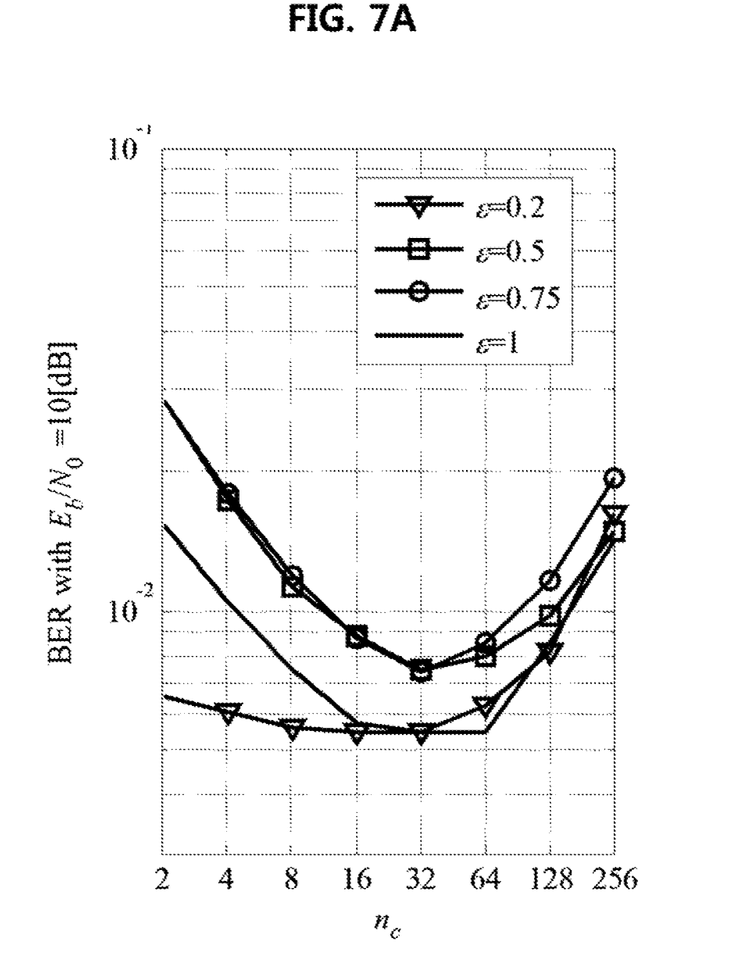
FIGS. 7A and 7B are graphs to illustrate performance evaluation results according to the number of subcarriers for each sub-block which a method of cancelling interference according to an example embodiment of the present invention.
Figure 7B:
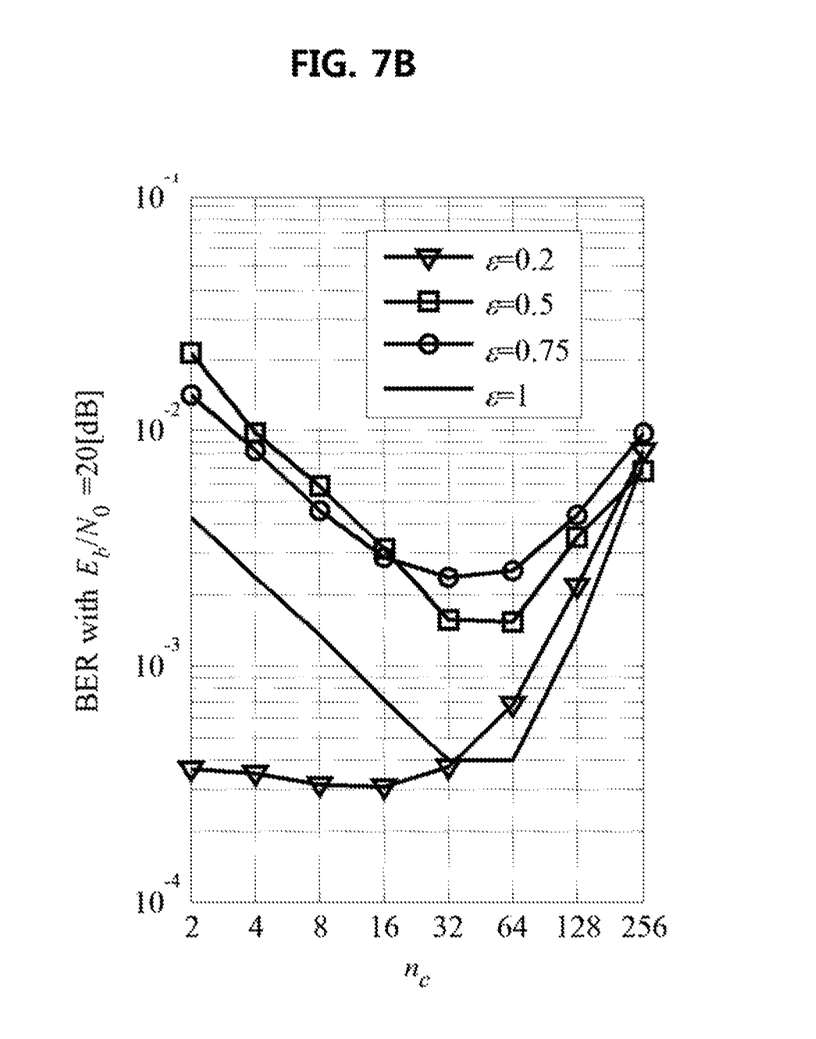

FIGS. 7A and 7B are graphs to illustrate performance evaluation results according to the number of subcarriers for each sub-block which a method of cancelling interference according to an example embodiment of the present invention, and illustrate performance evaluation results according to the number of subcarrier ($n_c$) to achieve optimized performances in a given frequency selective fading environment.

FIG. 7A illustrates bit error rates (BER) according to the number of subcarriers ($n_c$) for each sub-block when frequency error $\epsilon$ is one of 0.2, 0.5, and 0.75, and $E_b/N_0$ is 10 dB.

Also, FIG. 7B illustrates BERs according to the number of subcarriers ($n_c$) for each sub-block when frequency error $\epsilon$ is one of 0.2, 0.5, and 0.75, and $E_b/N_0$ is 20 dB.

Referring to FIGS. 7A and 7B, it can be identified that an optimal performance may be achieved when the number of subcarriers ($n_c$) for each sub-block is 16 for the given frequency selective fading environment.

That is, as compared with the traditional Alamouti method, the present invention may enhance performance in a frequency selective fading environment by dividing total available subcarriers into a plurality of sub-blocks and composing Alamouti code symbol pairs for each of the sub-blocks.

Figure 8:
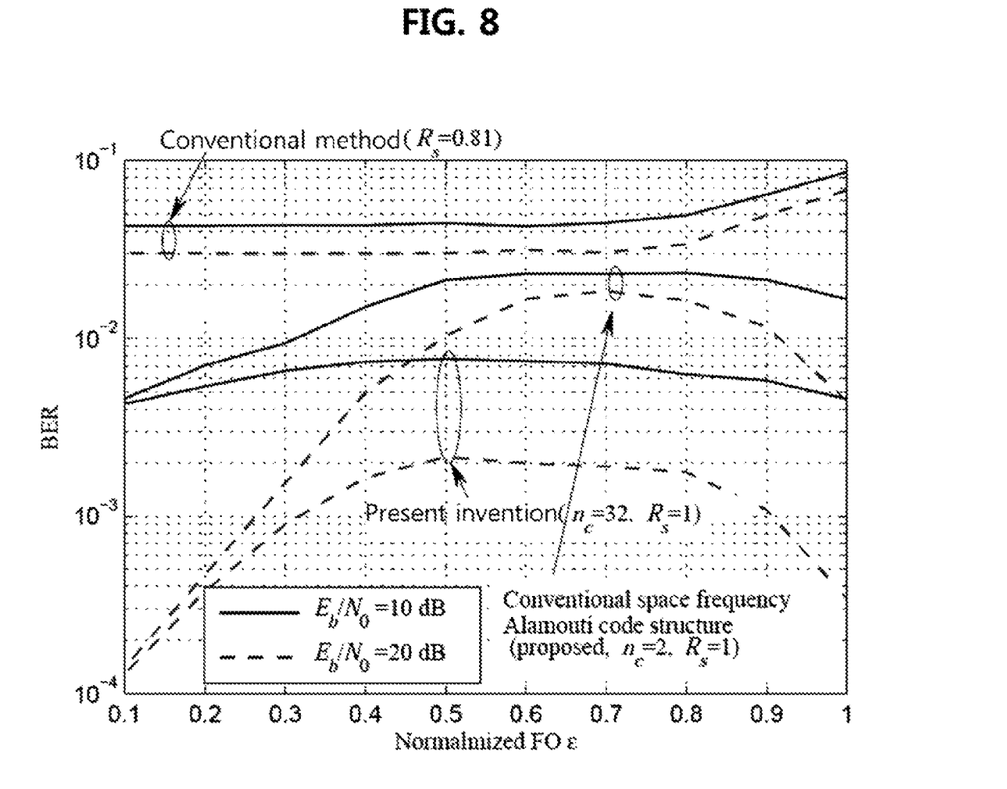
FIG. 8 is a graph to illustrate a result of comparison between a method according to the present invention and a traditional method.

FIG. 8 is a graph to illustrate a result of comparison between a method according to the present invention and a traditional method, and illustrates bit error rates for two methods according to normalized frequency error (FO, $\epsilon$).

In FIG. 8, $R_s$ may mean a data rate of each method, and the traditional method may mean a method of not dividing total subcarriers into sub-blocks as opposed to the method of the present invention.

As shown in FIG. 8, the method according to the present invention may have enhanced performance as compared with the traditional method of cancelling interferences due to frequency error.

Figure 9A:
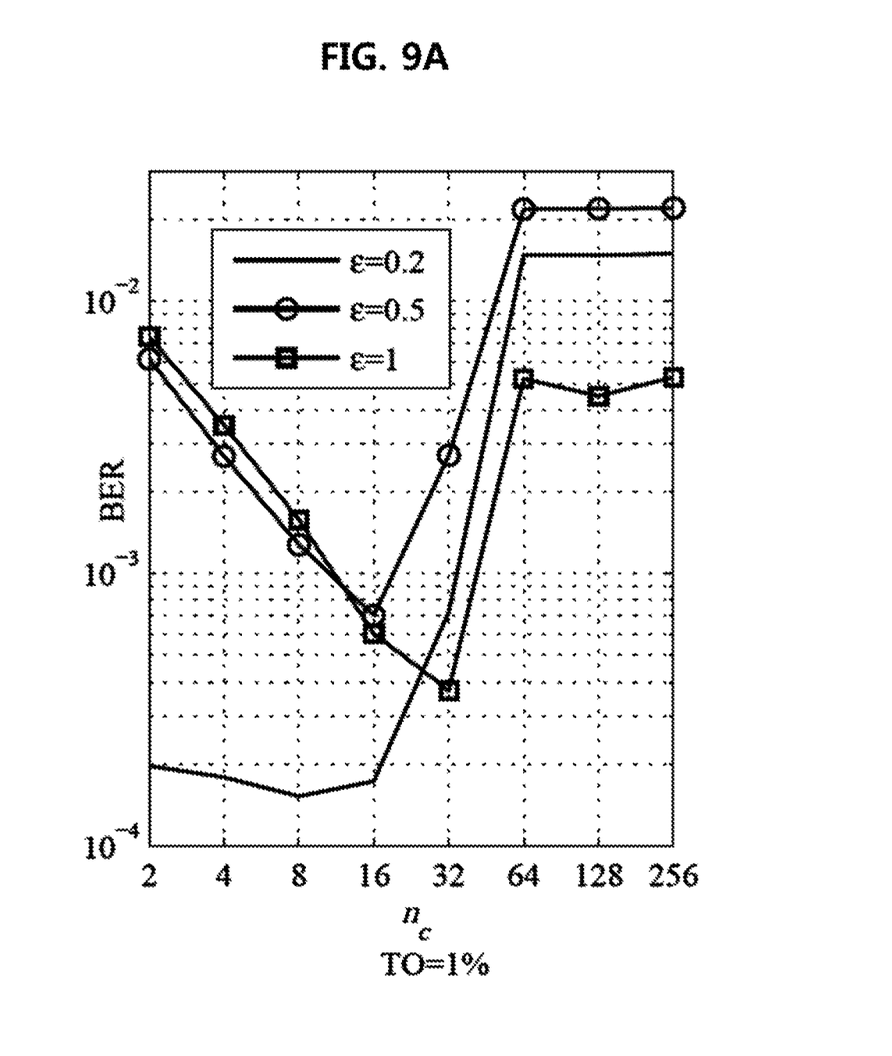
FIGS. 9A and 9B are graphs to illustrate performance evaluations result when a method of cancelling interference according to an example embodiment of the present invention is applied to a flat fading environment.
Figure 9B:
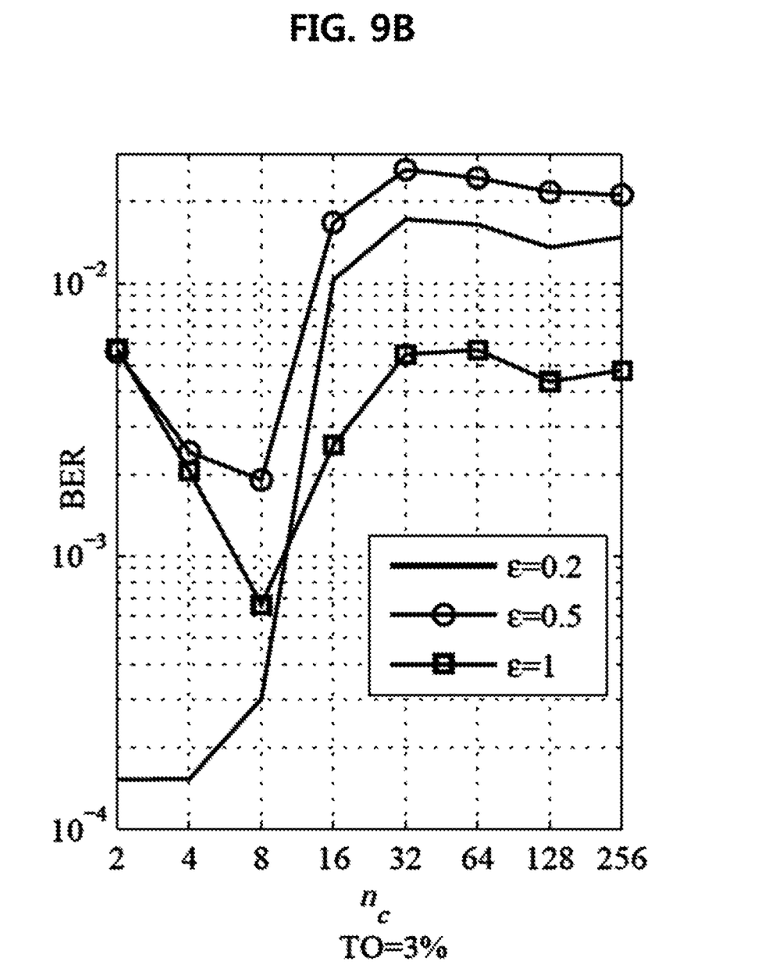

FIGS. 9A and 9B are graphs to illustrate performance evaluations result when a method of cancelling interference according to an example embodiment of the present invention is applied to a flat fading environment, and illustrate performance evaluation results in a case that timing offset and frequency error exist at the same time in a flat fading environment.

Specifically, FIG. 9A represents bit error rates (BER) according to the number of subcarriers ($n_c$) for each sub-block when the timing offset is 1% and the frequency error $\epsilon$ is one of 0.2, 0.5, and 1, and FIG. 9B represents bit error rates (BER) according to the number of subcarriers ($n_c$) for each sub-block when the timing offset is 3% and the frequency error $\epsilon$ is one of 0.2, 0.5, and 1.

From the performance evaluation results shown in FIGS. 9A and 9B, it can be identified that a method for cancelling interference according to the present invention may also be applied to a flat fading environment. Also, it can be known that the optimal number of subcarriers for cancelling interference due to timing offset may be 8 or 16.

That is, when timing offset between transmit antennas exist in a flat fading environment, a situation similar to the case of frequency selective fading environment may occur because fading characteristics for each subcarrier are different. Accordingly, the method of cancelling interference according to the present invention may be applied to a flat fading environment as well as a frequency selective fading environment, and may reduce inter-subcarrier interference significantly as shown in FIGS. 9A and 9B.

According to a method for cancelling inter-subcarrier interference in a wireless communication system and an apparatus for the same, in a frequency selective fading channel environment, total available subcarriers may be divided into a plurality of sub-blocks, and Alamouti code symbol pairs may be composed by using mirror images for each divided sub-block.

Thus, inter-subcarrier interferences due to frequency error between transmit antennas of a distributed antenna system or a cooperative transmission apparatus may be cancelled in the frequency selective fading channel environment.

Also, the method for cancelling inter-subcarrier interference according to the present invention may be applied to even a flat fading environment in order to cancel inter-subcarrier interference due to timing offset.

Also, the method for cancelling inter-subcarrier interference according to the present invention may be applied to various frequency selective fading environments by adjusting the number of sub-blocks (or, the number of subcarriers included in each sub-block) adaptively according to frequency selective characteristics for each of the various environments.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for cancelling inter-subcarrier interference, performed in a transmitting apparatus, comprising:
   dividing total available subcarriers into a plurality of sub-blocks,
   wherein a number of the sub-blocks is determined according to characteristics of a channel between the transmitting apparatus and a counterpart receiving apparatus;
   composing Alamouti code symbol pairs by mapping input symbols to subcarriers included in each of the plurality of sub-blocks; and
   performing inverse fast Fourier transform (IFFT) on the Alamouti code symbol pairs.

2. The method of claim 1, wherein the composing Alamouti code symbol pairs includes:
   locating a mirror point between ($n_c/2$)th subcarrier and ($n_c/2+1$)th subcarrier for each of the plurality of sub-blocks when each of the plurality of sub-blocks comprises $n_c$ subcarriers; and
   composing each pair of the Alamouti code symbol pairs by selecting pair of subcarriers located in mirror image points in reference to the mirror point.

3. The method of claim 1, wherein 2N-point IFFT is performed on the Alamouti code symbol pairs in the performing inverse fast Fourier transform (IFFT), wherein N is a natural number.

4. The method of claim 3, wherein the Alamouti code symbol pairs are inputted to inputs 1 to $n_c$ of the IFFT, and 0s are inputted to inputs ($n_c+1$) to $2n_c$ of the IFFT, wherein the inputs 1 to $2n_c$ are corresponded to each of the plurality of sub-blocks.

* * * * *